United States Patent [19]
McPherson

[11] Patent Number: 4,764,036
[45] Date of Patent: Aug. 16, 1988

[54] PCD ENHANCED RADIAL BEARING

[75] Inventor: James N. McPherson, Orange, Calif.

[73] Assignee: Smith International, Inc., Newport Beach, Calif.

[21] Appl. No.: 50,229

[22] Filed: May 14, 1987

[51] Int. Cl.[4] .................. E21B 4/02; F16C 33/24
[52] U.S. Cl. .................................. 384/276; 384/97; 384/285; 175/73; 175/320
[58] Field of Search .............. 384/92, 95, 97, 275, 384/276, 280–285, 295, 296, 297, 907.1; 175/73, 320, 107

[56] References Cited
U.S. PATENT DOCUMENTS

| | | | |
|---|---|---|---|
| 3,879,094 | 4/1975 | Tschirky et al. | 384/91 X |
| 4,410,054 | 10/1983 | Nagel et al. | 384/95 X |
| 4,560,014 | 12/1985 | Geczy | 384/285 X |

Primary Examiner—John Petrakes
Assistant Examiner—Thomas R. Hannon
Attorney, Agent, or Firm—Price, Gess & Ubell

[57] ABSTRACT

Bearing rings containing PCD faced bearing inserts are mounted adjacent tungsten carbide radial bearing surfaces at the ends of respective bearing sleeves attached to the drive shaft of a down hole well drilling motor, thereby preventing excessive wear at the extremities of the radial bearing surface in controlled and steerable drilling applications.

21 Claims, 1 Drawing Sheet

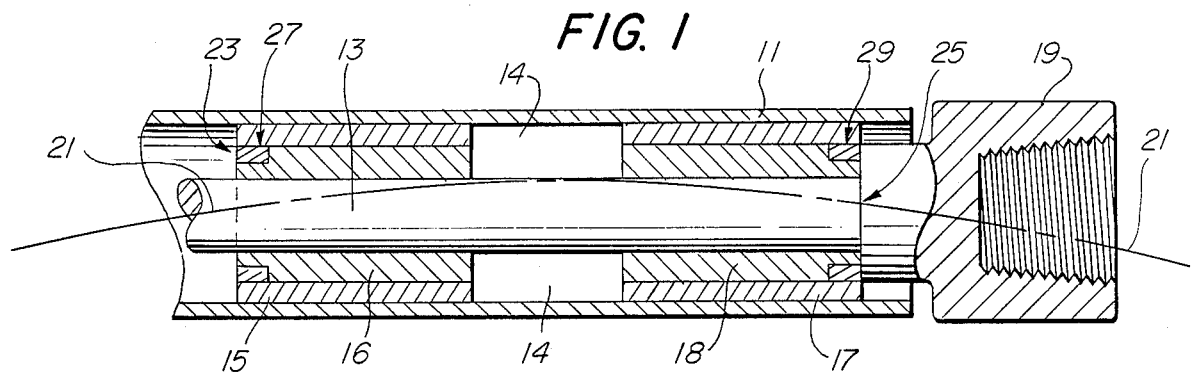
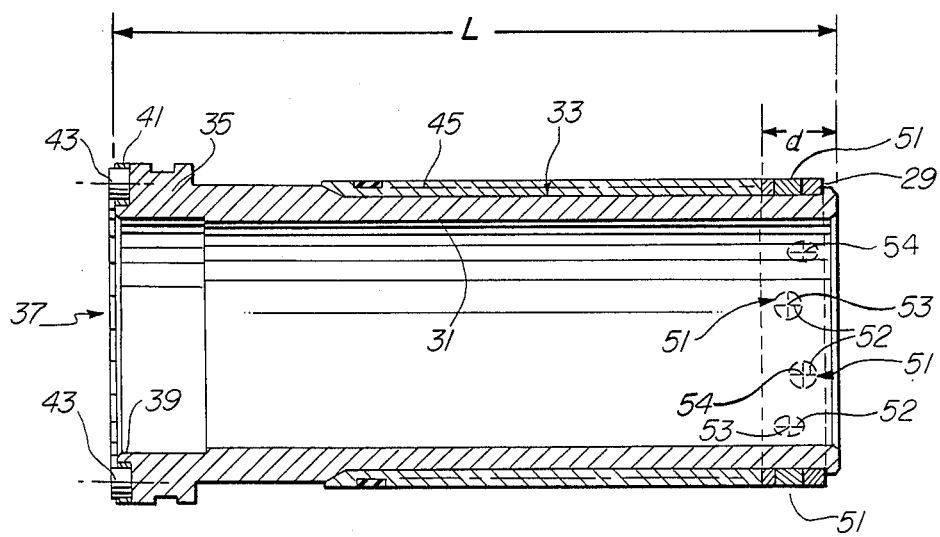
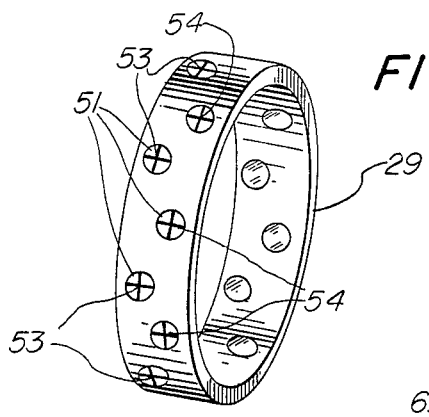
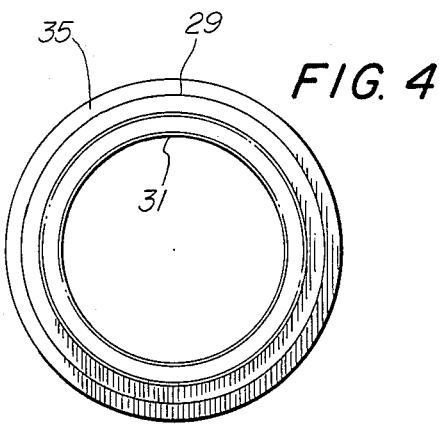
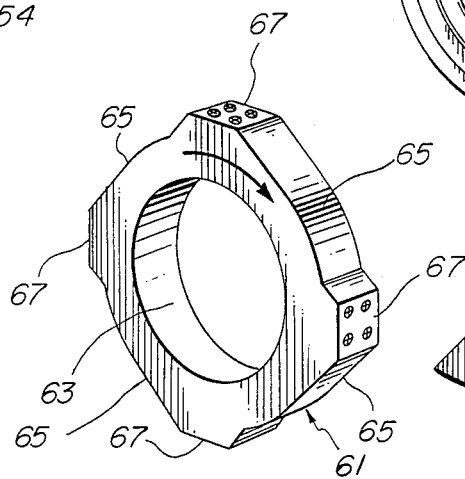
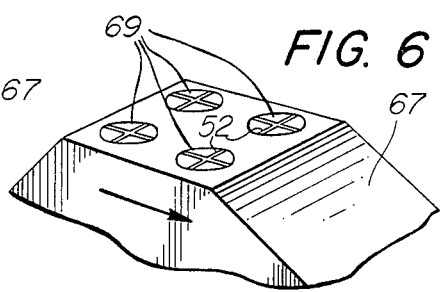

4,764,036

PCD ENHANCED RADIAL BEARING

BACKGROUND OF THE INVENTION

1. Field of the Invention

The subject invention relates to bearing and particularly to radial bearings used in directional or steerable earth boring applications.

2. Description of Related Art

Radial bearings for use in earth boring applications such as oil well drilling are generally well-known and particularly known for use in down hole drilling motors. Radial bearings most recently have been fabricated using tungsten carbide materials, such as tungsten carbide buttons or tungsten carbide chips bonded to a bearing sleeve or drive shaft.

For some time, radial bearings used in directional or steerable drilling applications have exhibited excessive wear at the upper and lower extremities of the radial bearing surface. Such wear arises because the drive shaft to which such bearings are attached is subjected to bending during directional or steerable drilling. While drive shafts used in such can accomodate such bending, the cooperating radial bearings cannot.

SUMMARY OF THE INVENTION

Accordingly, it is an object of the invention to provide an improved bearing structure;

It is another object of the invention to provide an improved radial bearing for an earth boring motor;

It is yet another object of the invention to provide an improved radial bearing which alleviates the problem of excessive wear at the radial bearing surface extremities, particularly in directional and steerable drilling applications;

It is yet another object of the invention to provide an improved radial bearing having surface extremities which incorporate a hydrodynamic feature;

It is still another object of the invention to provide an economical approach to eliminating excessive wear at the extremities of radial bearing surfaces in directional and steerable drilling applications.

According to the invention, the extremities of the radial bearing surface are modified to incorporate rings carrying polycrystalline diamond (PCD) bearing surfaces. In one embodiment, PCD-faced bearing inserts are shrink fitted into holes in a steel shell, which is then brazed onto a cylindrical bearing sleeve, which also carries a tungsten carbide radial bearing surface and thrust inserts. One such ring is mounted at one extremity of the radial bearing surface near the top of the drive shaft, while a second ring is mounted at the opposite radial bearing surface extremity, near the bottom of the drive shaft. Cooperating rings carrying PCD inserts may be mounted in the drive shaft housing, although it is preferred to avoid such rings in order to reduce expense.

In a second embodiment, PCD inserts are placed in mesas at the end of ramps formed around the circumference of a mounting ring or shell. The mounting ring or shell is again mounted on a bearing sleeve. As the shell and sleeve rotates with the drive shaft, a hydrodynamic bearing effect results.

BRIEF DESCRIPTION OF THE DRAWINGS

In the accompanying drawings

FIG. 1 is a schematic crossectional drawing illustrating the radial bearing wear problem addressed by the preferred embodiment.

FIG. 2 is a crossection of a cylindrical bearing sleeve taken on a plane parallel to its axis illustrating the preferred embodiment.

FIG. 3 is a perspective view of the bearing sleeve of the preferred embodiment.

FIG. 4 is a view of the end of the sleeve of FIG. 2 which mounts the bearing sleeve of the preferred embodiment.

FIG. 5 is a perspective of a radial bearing ring according to a second embodiment.

FIG. 6 is a detail of one portion of the radial bearing ring of FIG. 5.

DESCRIPTION OF THE PREFERRED EMBODIMENT

FIG. 1 illustrates in schematic fashion a typical drilling motor bearing assembly configuration. The motor includes a housing 11 wherein a drive shaft 13 is mounted by means of thrust bearings 14, an upper stationary radial bearing 15 and an upper rotating radial bearing 16, a lower stationary radial bearing 17 and a lower rotating radial bearing 18. The drive shaft 13 is typically cylindrical and includes a bit box 19 at one end for mounting a drilling bit and an upper connection 21 for attachment to a connecting rod or other motor drive apparatus not shown. The thrust bearing 14 may comprise for example, opposing arrays of PCD faced thrust inserts, one array fixed to the housing 11 and the other adapted to rotate with the drive shaft 13.

The drive shaft 13 is subjected to bending forces which arise particularly in directional and steerable drilling applications. Such forces tend to bend the shaft 13 and attached rotating radial bearings 16, 18 in a manner illustrated schematically by dashed line 21 in FIG. 1. In order to prevent excessive wear to the upper end 23 of the upper radial bearing 16 and the lower end 25 of the lower radial bearing 18 caused by such bending forces, bearing rings 29, 29 are employed according to the preferred embodiment.

One of the bearing rings 29 of the preferred embodiment is shown in more detail in FIG. 2. The ring 29 is mounted on a generally cylindrical bearing sleeve 31 which is in turn mounted, for example, by an eccentric lock, to rotate with a drive shaft such as the drive shaft 13 of FIG. 1.

The bearing sleeve 31 has an elongated generally cylindrical recessed area 33 on its outer surface and widens to form a thrust head 35 at one end 37. The thrust head 35 includes a hub 39 which mounts a ring 41. The ring 41 contains through holes wherein PCD-faced thrust bearing inserts 43 are mounted with their faces in a common plane. The ring 41 and inserts 43 form a subassembly which is mounted on the hub 39 and brazed into place. The inserts 43 are preferably provided with cooling grooves, e.g. 52, cut into the PCD surface.

The elongated recessed area 33 has a tungsten carbide radial bearing surface 45 thereon such as tungsten carbide buttons fixed in a matrix or tungsten carbide chips in an infiltrant matrix. The tungsten carbide permits a high velocity flow rate through the tool, e.g. 20–30 gallons per minute without excessive wear. The tungsten carbide surface 45 may comprise tungsten carbide buttons in a nickel silver matrix, for example, as disclosed in U.S. Pat. No. 4,560,014, assigned to Smith International, Inc.

Alternatively, the radial bearing surface 45 may comprise macro-crystalline tungsten carbide powder blended together with cemented tungsten carbide cobalt chips in a copper infiltrant matrix. The tungsten carbide mixture is preferably comprised of sixty percent (60%) by weight of 80 mesh and down macro-crystalline tungsten carbide, commercially available as the Kenametal product designated P-90. The range of particle sizes, i.e. 80 mesh and down, is selected for optimum packing density of the mixture. The other component of the mixture is forty percent (40%) by weight of cemented tungsten carbide cobalt chips, for example TCM 10/18 mesh crushed WC-Co C grade. A suggested range for the percentage of weight of tungsten carbide cobalt chips is from forty to eighty percent (40-80%), with the preferred percentage being forty percent (40%). The tungsten carbide mixture may be packed in an upright mold and infiltrated from the top with liquid copper to form the radial bearing matrix.

In manufacture, the radial bearing surface 45 is molded to the steel sleeve 31 (FIG. 1) before attachment of the thrust bearing ring 41, because a higher temperature is required in the process of applying the radial bearing surface than is required to braze the diamond thrust bearing inserts and ring into place.

One end of the tungsten carbide radial bearing surface 45 is terminated at a distance "d" from the end of the sleeve 31. The distance "d" is for example one inch in a sleeve 31 of total length "L" of 11.5 inches.

The distance "d" permits the attachment of the bearing ring 29 in order to accomodate excessive wear at the extremity of the steel sleeve 31. The tungsten carbide surface 45 in such an embodiment may be, for example, seven inches in length.

Termination of the radial bearing at the distance "d" may be provided by filling the upright mold with tungsten carbide material up to about one and one quarter inches from the top. About one quarter inch of tungsten powder is then added, after which infiltration e.g. with copper is performed. The one quarter inch tungsten layer permits easily machining a squared off end adjacent which the ring 29 of the preferred embodiment fits.

The bearing ring 29 is a cylindrical steel ring having through-holes drilled on radial lines perpendicular to its axis. Bearing inserts 51 are inserted into holes spaced around the bearing ring 29. For a sleeve 31 with an outer diameter "o.d." of 4.73 inches, an illustrative number of buttons is fifteen. The buttons may have their centers 53, 54 offset as shown, rather than lying on a common circle in order to provide a wider base of bearing surface. The centers 53, 54 are preferably alternately staggered with first centers 53 lying on a common circumferential circle and second centers 54 lying on a second circumferential circle.

The bearing inserts 51 have planar PCD faces with fluid cooling grooves in their faces. Such inserts may be 0.529 inches (4.06 mm) in diameter and 0.160 inches (13.4 mm) in height with a PCD face surface thickness of 0.025 inches (0.63 mm). The thrust inserts 43 may be the same size as the radial inserts 51.

To fabricate a ring 29 according to the preferred embodiment, a steel ring 29 having through-holes drilled therein as described is placed on a mandrel and heated. The PCD inserts 51 are cooled and then slipped into the holes in the ring 29. When the ring 29 and inserts 51 return to room temperature on the mandrel, the inserts 51 became shrink-fitted into the steel ring 29. The ring 29 and inserts 51 are then brazed onto the end of the sleeve 31 at approximately 1100° Fahrenheit, well below the temperature used to form the adjacent tungsten carbide radial bearing surface 45. In this manner, the integrity of the tungsten carbide surface 45 is preserved. Alternate methods of attachment may also be employed.

A second ring which is like ring 29 is used to supply the bearing ring 27 at the upper end of the drive shaft 13. A sleeve which is the mirror image of the sleeve 31 shown in FIG. 2 is used for this purpose.

In addition, PCD inserts may be attached to the stationary radial bearings 15, 17 opposite the inserts 51 in the two bearing rings 27, 29 to provide a cooperating bearing surface on the stationary radial bearings 15, 17. Where wear conditions permit, it is advantageous to avoid such cooperating PCD surfaces on stationary radial bearings 15, 17 in order to reduce expense. In such case, the cooperating housing bearing surface is formed of tungsten carbide material, for example like that used to form radial bearing surface 33.

FIG. 5 illustrates a modified bearing ring embodiment for application on the end of bearing sleeves such as the sleeve 31 shown in FIG. 2. The ring 61 of FIG. 5 includes an inner cylindrical opening 63. The outer surface of the sleeve 61 includes four ramps 65 which lead to respective mesas 67. As shown in more detail in FIG. 6, each mesa 67 mounts four PCD inserts 69. The inserts 69 may be fixed in wells drilled in the mesas 67. The bearing ring 61 is attached to a bearing sleeve or otherwise such that it spins with the drive shaft 13. The ramps 65 create a hydrodynamic bearing effect by compressing a thin layer of fluid between the mesa 67 and the cooperating bearing surface of the housing. In such an embodiment, the cooperating stationary bearing surface can be made of either tungsten carbide or PCD inserts, as in the previous embodiment.

As will be appreciated, the just described bearing structures provide a relatively economical solution to the problem of excessive radial bearing wear in steerable and directional drilling applications. The disclosed approaches are applicable to a variety of types and sizes, and placements of radial bearings. For example, while the preferred embodiment is shown in conjunction with a radial bearing which has thrust bearings fixed to its sleeve, it may be used with radial bearings which are separate from the thrust bearings.

Therefore, within the scope of the appended claims, it is to be understood that the invention may be practiced other than as specifically described herein.

What is claimed is:

1. A bearing structure, comprising:
    a radial bearing having a cylindrical wear surface formed on a cylindrical radial bearing support surface, said wear surface extending less than the entire length of said bearing support surface, leaving a portion of said radial bearing support surface exposed; and
    means on the exposed portion of said radial bearing support surface for arraying diamond faced bearing inserts for carrying radial bending loads.

2. The bearing structure of claim 1 wherein said means for arraying comprises a cylindrical ring having a plurality of holes arrayed around its circumference, said inserts being mounted in said holes.

3. The bearing structure of claim 2 wherein said holes comprise through holes in said cylindrical ring.

4. The bearing structure of claim 3 wherein said ring and inserts are brazed onto said exposed portion of said cylindrical support surface.

5. The bearing structure of claim 3 wherein said through holes are drilled on radial lines perpendicular to the axis of said cylindrical ring.

6. The bearing structure of claim 5 wherein said through holes have their centers alternately staggered.

7. The bearing structure of claim 6 wherein said alternate centers lie on one or the other of two circles on the circumference of said ring.

8. The bearing structure of claim 1 wherein said inserts comprise polycrystalline diamond (PCD) faced inserts.

9. The bearing sleeve of claim 1 wherein said means for arraying comprises:
a ring means having a plurality of mesas formed about its outer circumference and a ramp leading up to each mesa, each mesa mounting at least one PCD faced insert.

10. A bearing structure, comprising:
a unitary bearing sleeve having a thrust head at one end and an elongated recessed outer cylindrical surface at the opposite end;
a radial bearing having a wear surface including tungsten carbide formed on said recessed outer cylindrical surface, said wear surface extending less than the entire length of said recessed outer cylindrical surface, leaving a portion of said outer cylindrical surface exposed; and
means on the exposed portion of said outer cylindrical surface for arraying PCD faced bearing inserts for carrying radial bending loads.

11. The bearing structure of claim 10 wherein said means for arraying comprises a cylindrical ring having a plurality of holes arrayed around its circumference, said inserts being mounted in said holes.

12. The bearing structure of claim 11 wherein said holes comprise through holes in said cylindrical ring.

13. The bearing structure of claim 12 wherein said rings and inserts are brazed onto said exposed portion of said outer cylindrical surface.

14. The bearing structure of claim 12 wherein said through holes are drilled on radial lines perpendicular to the axis of said cylindrical ring.

15. The bearing structure of claim 14 wherein said through holes have their centers alternately staggered.

16. The bearing structure of claim 15 wherein said alternate centers lie on one or the other of two circles on the circumference of said ring.

17. The bearing structure of claim 10 wherein said means for arraying comprises:
a ring means having a plurality of mesas formed about its outer circumference and a ramp leading up to each mesa, each mesa mounting at least one PCD faced insert.

18. Downhole drilling apparatus comprising:
a drive shaft;
upper and lower radial bearings mounted on said drive shaft, said upper radial bearing including an upper bearing ring at the upper end thereof, the lower radial bearing including a lower bearing ring at the lower end thereof, the upper and lower bearing rings each carrying polycrystalline diamond (PCD) faced bearing insert means disposed for carrying radial loads.

19. The downhole drilling apparatus of claim 18 wherein said upper and lower bearing rings each comprise a cylindrical ring having a plurality of through holes drilled therein on radial lines perpendicular to the axis of the cylindrical rings.

20. The downhole drilling apparatus of claim 19 wherein said through holes have their centers alternately staggered on two circumferential lines.

21. The downhole drilling apparatus of claim 19 wherein each said ring has a plurality of mesas formed about its outer surface and a ramp leading up to each mesa, each mesa mounting at least one PCD faced insert.

* * * * *